US012640916B2

(12) United States Patent
Riedinger

(10) Patent No.: US 12,640,916 B2
(45) Date of Patent: May 26, 2026

(54) METHOD FOR QUANTUM-SECURED COMMUNICATION

(71) Applicant: Universität Hamburg, Hamburg (DE)

(72) Inventor: Ralf Riedinger, Vaterstetten (DE)

(73) Assignee: Universität Hamburg, Hamburg (DE)

( * ) Notice: Subject to any disclaimer, the term of this patent is extended or adjusted under 35 U.S.C. 154(b) by 12 days.

(21) Appl. No.: 18/706,249

(22) PCT Filed: Oct. 7, 2022

(86) PCT No.: PCT/EP2022/077971

§ 371 (c)(1),
(2) Date: Apr. 30, 2024

(87) PCT Pub. No.: WO2023/078639

PCT Pub. Date: May 11, 2023

(65) Prior Publication Data

US 2025/0080338 A1        Mar. 6, 2025

(30) Foreign Application Priority Data

Nov. 5, 2021      (DE) .......................... 102021128883.5

(51) Int. Cl.
*H04L 9/08*                (2006.01)
(52) U.S. Cl.
CPC .......... *H04L 9/0852* (2013.01); *H04L 9/0838* (2013.01)
(58) Field of Classification Search
CPC ................ H04L 9/0816; H04L 9/0838; H04L 9/0852–0858
See application file for complete search history.

(56) References Cited

U.S. PATENT DOCUMENTS 12,200,114 B1 *   1/2025   Stapleton .............. H04L 9/0861
2006/0062392 A1   3/2006   Lee et al.
            (Continued)

FOREIGN PATENT DOCUMENTS

EP        1 833 009 A1    9/2007
WO      2020/260751 A1   12/2020

OTHER PUBLICATIONS

PCT/EP2022/077971; International Filing Date Oct. 7, 2022; English Translation of International Search Report and Written Opinion; Date of Mailing May 2, 2024 (8 pages).
                        (Continued)

*Primary Examiner* — Daniel B Potratz
(74) *Attorney, Agent, or Firm* — Barclay Damon LLP

(57)                ABSTRACT

A method of encryption for quantum-secured communication includes structuring a pair of quantum-enabled hardware security modules to include an interface to a temporarily common quantum channel and an interface to a communication channel. A secret key is shared with the pair of quantum-enabled hardware security modules for a symmetrical encryption between the pair of quantum-enabled hardware security module. The secret key is obtained using quantum key distribution via the temporarily common quantum channel. The temporarily common quantum channel is disconnected from at least one of the pair of quantum-enabled hardware security modules and a communication network is structured to include at least two nodes configured to communicate using symmetrical encryption between the pair of quantum-enabled hardware security modules sharing a same secret key.

10 Claims, 6 Drawing Sheets

(56) References Cited

U.S. PATENT DOCUMENTS

| 2013/0315395 | A1* | 11/2013 | Jacobs | H04L 9/0852 |
| | | | | 380/278 |
| 2018/0109377 | A1 | 4/2018 | Fu | |
| 2022/0321333 | A1* | 10/2022 | Wissel | H04L 9/0855 |
| 2024/0171386 | A1* | 5/2024 | Fujiwara | H04L 9/085 |

OTHER PUBLICATIONS

PCT/EP2022/077971; International Filing Date Oct. 7, 2022; International Search Report and Written Opinion; Date of Mailing Feb. 1, 2023 (15 pages).

* cited by examiner

2

3

4

5

6

1

METHOD FOR QUANTUM-SECURED COMMUNICATION

CROSS REFERENCE TO RELATED INVENTION

This application is a national stage application pursuant to 35 U.S.C. § 371 of International Application No. PCT/EP2022/077971, filed on Oct. 7, 2022, which claims priority to, and benefit of, German Patent Application No. 10 2021 128 883.5, filed Nov. 5, 2021, the entire contents of which are hereby incorporated by reference.

TECHNOLOGICAL FIELD

The following disclosure pertains to quantum-secured communication in particular to quantum-secured communication over large distances.

BACKGROUND

Encryption of data is essential to keep the data private from other entities with access a data network. This encryption can be achieved, for example, with a public key infrastructure. To further the security, the cryptographic routines can be performed in a hardware security module, which stores the keys in a dedicated memory, such that the keys are never exposed to the host of the module. However, the use of asymmetric encryption schemes relies on the empirical computational complexity of mathematical functions, such as inverting trapdoor functions or factorization. As the vast majority of cryptanalysis research is not public, it is not known which algorithms can be inverted with conventional state-of-the-art super computers. Furthermore, the advent of quantum computation potentially can change this complexity. Quantum algorithms are known which can break asymmetric encryption algorithms based on for example elliptic curves or discrete logarithms. While supposedly quantum resistant asymmetric encryption algorithms are being developed, it is hard to predict how long they will be considered secure, given the lack of empirical testing versus classical adversaries for most algorithms and versus quantum adversaries for all algorithms, as the capabilities of quantum computers and algorithms are rapidly evolving.

An alternative is quantum key distribution, which was developed in parallel to public key distribution, but relies on fundamental physical properties, rather than the assumed computational complexity. Here, a quantum state is sent over a quantum channel between two communicating partners. Choosing random bases for the encoding and measurement of the quantum state, a potential adversary cannot eavesdrop on the quantum channel without introducing errors between the communicating partners. By confirming (via a public discussion) that the error rate of the transmitted quantum states was below a threshold, the partners can be certain that the channel was secure. This can be used to generate an information theoretically secure key, i.e. a key that is certain to be known only to the two partners based on physical principles. This can fundamentally not be achieved by public key algorithms, as the public keys in principle contain all the information about the secret key.

However, the data rate for direct quantum communication over that channel is limited by the loss in this channel. Hence quantum key distribution (QKD) is limited to a few 100 km over optical fibres, with an exponential drop in the secret key rate with distance. Over short distances, QKD still requires additional hardware and potentially infrastructure, resulting in relatively high costs compared to the widespread public key infrastructure. The secret key rate in current implementations is moreover too low for one-time-pad encryption of high bandwidth data channels, such that it is usually used to generate keys for symmetric encryption protocols, hence sacrificing the information theoretical security of the communication channel. For communication over long distances, quantum repeater networks could relay entanglement, however they are not yet practical. Instead, quantum key distribution networks are deployed, consisting of short QKD links and trusted relay stations. These networks are expensive to set up and maintain, as they require many live quantum links, and relay stations can potentially be vulnerable to adversaries.

The technical problem of the invention is to provide a method for quantum secured communication over long distances without building a network requiring many quantum links.

SUMMARY

An embodiment of a method for quantum-secured communication includes providing a pair of quantum-enabled hardware security modules (qHSM). This pair comprises an interface to a temporarily common quantum channel and an interface to a conventional communication channel. The temporarily common quantum channel is used during the initialization of the pair of qHSM. The interface to the conventional communication channel is used to exchange symmetrical encrypted messages, wherein conventional or classical is used in the meaning of a non-quantum communication. Both quantum-enabled hardware security modules share a secret key Q for symmetrical encryption between both modules. The secret key Q is exchanged during initialization over the temporarily available common quantum channel. After the secret key Q has been exchanged, the common quantum channel is disconnected from at least one of the qHSM. At this step of the method, the secret key Q is securely stored within each qHSM without providing access to the key material for external users. After the initialization step the communication network is provided in which at least two knots communicate using symmetrical encryption between the pair of quantum-enabled hardware security modules sharing the same secret key Q. The main advantage of the communication network is that no life quantum link or quantum channel is required in the network. Due to the initialization step the network can use symmetrical encryption based on the shared secret key Q, which is information theoretically secure. Hence, in contrast to methods relying on asymmetric cryptography to establish a common secret, it is fundamentally not vulnerable to cryptanalysis by eavesdroppers.

In an exemplary embodiment, a master key M is generated from the shared secret key Q. Session keys K for the encrypted communication between the quantum-enabled hardware security modules are derived based on the master key M. The step of generating a master key M and deriving session keys K from the master key are carried out within each qHSM using the shared secret key Q which is securely stored within the qHSM. The master key M and in consequence the session keys K provide sufficient security for the communication network. Hence, the frequent key rotation, required as a counter measure against cryptanalysis of the symmetrically encrypted data channel, is provided by conventional cryptographic algorithms, in contrast to state of the art quantum key distribution, which requires the costly quantum communication infrastructure.

In order to provide a secure initialization step, the secret key Q is obtained from an entangled quantum state which is sent over a common quantum channel between the two qHSM or which is exchanged between the qHSM and can be confirmed in a public discussion. In the public discussion e.g. regarding the basis of measurement of the entangled state it is confirmed that the entangled quantum state of sufficient quality was exchanged over the common quantum channel. The security of the secure hardware modules is further increased by using a cryptographic coprocessor generating the session keys. The cryptographic coprocessor is integrated on the same hardware as a photon detector of the qHSM. The cryptographic coprocessor and the photon detector are provided on the same hardware chip, so that the security of the common quantum channel is increased for the exchange of the secret key Q. Starting with the initial master key $M_0$, each of the qHSM transforms a previous master key $M_i$ after a predetermined period of time and/or after a predetermined number of data packages into a new master key $M_{i+1}$. This process step of transforming is carried out by both of the qHSM in the same way. For transforming the previous master key into the new master key, it is possible to use block ciphers and/or one-way permutations, preserving the information content of the initial information theoretically secure shared secret Q. This transformation is usually defined by a temporary key, derived in parts from the previous master key, for transforming the previous master key to the new master key. In another environment, it is also possible to negotiate the temporary key between the two quantum-enabled hardware security modules. When negotiating the temporary key, it can be exchanged through the symmetrically encrypted communication channel, protecting it against cryptanalysis of assymetric encryption. The idea of a temporary key is that together with a secret key Q, the temporary key can be used for transforming the master key, renewing the entropy involved in the key generation and further strengthening the key rotation process against cryptanalysis.

In an embodiment, a device configured for quantum-secured communication includes a pair of quantum-enabled hardware security modules qHSM. Each module comprises a cryptographic coprocessor, a classical communication interface and at least one interface for a common quantum channel. The cryptographic coprocessor is adapted to generate a secret key from received photons exchanged via the interface to the common quantum channel. The secret key Q is generated in an initialization step. Based on the secret key Q, each cryptographic coprocessor is adapted to generate a master key wherein both cryptographic coprocessors are provided for a symmetrical encrypted communication via the classical communication channel between the two qHSM in a communication network. The pair of qHSM is during the initialization step connected via a common quantum channel to exchange photons in particular to exchange photons in an entangled quantum state. After the secret key Q is generated, there is no longer any need for a common quantum channel for the two qHSM, and the qHSM can be disconnected, such that the communication partners can be separated by any distance.

In a preferred embodiment, a plurality of avalanche photodetectors is provided in each module. Each of the avalanche photodetectors is connected to an optical input of the respective module in particular to an input of the cryptographic coprocessor.

In order to establish a symmetrically encrypted communication, the cryptographic coprocessor is adapted to generate an initial master key $M_0$ from a symmetric stretching key S and the secret key Q. The initial master key $M_0$ is longer than the secret key Q.

The cryptographic coprocessor is adapted to generate new master keys $M_{i+1}$. This is done by transforming a previous master key $M_i$ after a predetermined period of time and/or after a predetermined number of data packages. Of course, it is important that both qHSM transform reliably the previous master key $M_i$ into a new master key $M_{i+1}$ in a synchronized way. For transforming the master keys block ciphers and/or one-way permutations can be used.

The master key M is used to generate session keys K which are used for the symmetrical encrypted communication between both qHSM. Furthermore, it is also possible to use a temporary key for transforming the master keys. The temporary key can be negotiated or computed by the two qHSM over the symmetrically encrypted channel. The temporary key together with the secret key Q can be used to generate new master keys.

BRIEF DESCRIPTION OF THE DRAWINGS

The invention is in detail described with reference to the attached figures.

DETAILED DESCRIPTION

Figure 1:
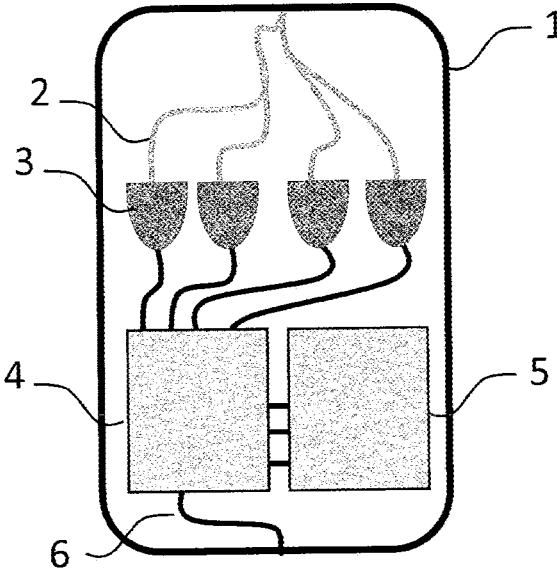
FIG. 1 schematically shows an embodiment of a single qHSM according to the invention.

The present invention solves the problem without substantially sacrificing security of the communication compared to symmetric encryption. Instead of using repeater stations with live quantum channels, quantum-enabled hardware security modules (qHSM) 1 are used as shown in FIG. 1. These hardware security modules are pairwise provisioned with information theoretically secure secret keys, using high-rate quantum key distribution over short distances. The qHSM 1 ensures through hard- and software that keys are not exposed, and can be secured against quantum and conventional side channel attacks, such that (quantum) key provisioning can in principle be performed by an untrusted third party, if the hardware is specified for unsupervised operation. For example, entanglement-based quantum key distribution can be employed, such as the Eckard 91 Protocol. This allows for a symmetrical design of the qHSM, requiring in this case only passive optics for the choice of the measurement basis 2, and single photon detectors 3, like silicon avalanche photodetectors, which can both be integrated on the same chip as the digital processor 4 and the memory 5 of the qHSM. The digital processor 4 includes a cryptographical coprocessor which are connected to a conventional communication port 6.

Figure 2:
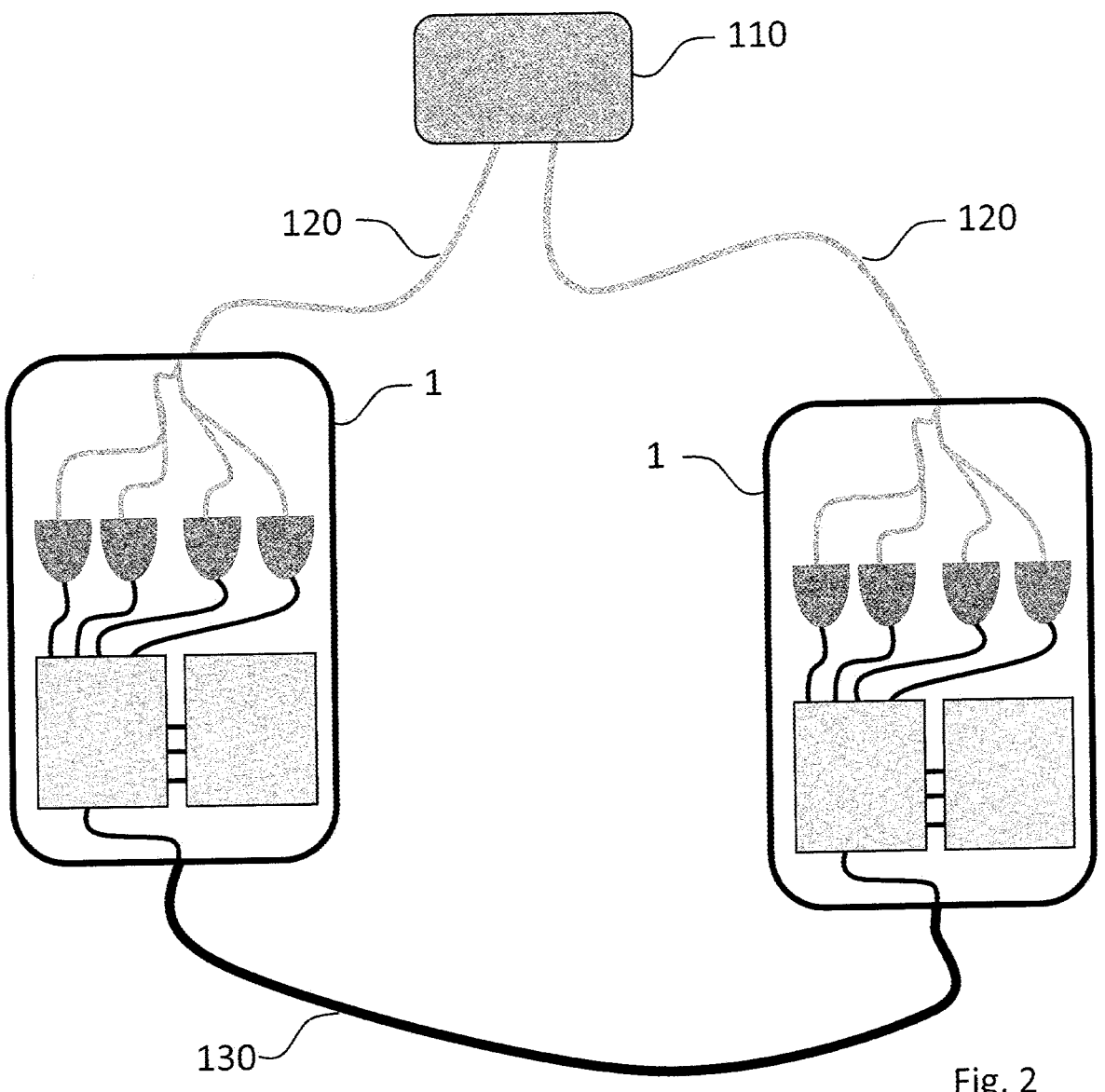
FIG. 2 schematically illustrates an embodiment of an initialization for two qHSM.

As indicated in FIG. 2 the conventional communication port 6 is used for queries by users or communication with other qHSM 130. Here, for key provisioning, a source of entangled photons is required 110. This source can be used to pair numerous qHSM sequentially. As the entangled photons can be provided via fiber optics 120, the provider of the entangled photons does not need to physically obtain or handle the qHSM for key provisioning. For provisioning, the two qHSM need to be able to communicate in a public discussion of the quantum key distribution protocol with the other qHSM 130.

Making use of the high secret key rate of quantum key distribution (QKD) over short distances, the common secret can be long (512 bit or longer) compared to conventional symmetric communication keys. It will be used as a source key to derive communication keys that are employed to encrypt the communication between the paired qHSM. After the pairing, the quantum channel can be disconnected and the paired qHSM are in their operational state. Using rekeying mechanisms, the lifetime of the quantum-provisioned key can be extended to the combinatorial limit, which scales exponentially with key length. Hence, the encrypted communication channel between two paired modules can be deemed safe, as long as the hardware security module is deemed safe, which is a limiting case for any encryption mechanism.

FIGS. 1 and 2 show that qHSM 1 is realized using a silicon-based microprocessor 4 with integrated silicon avalanche photodetectors 3. Two qHSM are initialized using the Eckart 91 protocol, where a laser with wavelength 405 nm pumps a nonlinear crystal 110 to generate entangled photons at a wavelength of wavelength 810 nm and are coupled into a single mode fiber 120. Silicon avalanche photodetectors (APDs) are highly sensitive at this wavelength and can be integrated in the silicon processor chip. The fibers are coupled to the APDs via an integrated photonics layer of the chip comprising non-polarizing and polarizing beamsplitters. The qHSM 1 use their communication ports 6 to perform bases disclosure, error rate determination, error correction and privacy amplification to generate the secret key Q which they store in an encrypted state in their hardened memory. Thereafter the fibers are disconnected. The qHSM can now use an internal counter with a keyed hash function to derive communication keys from the secret key Q. Users can query the module with a message, which encrypts it with the communication key derived by the cryptographic coprocessor and finally the cipher text is returned to the user. Hence also the communication keys are not exposed. The cipher text can now be sent via the internet to the owner of the second qHSM, which is queried and returns the deciphered plain text. After a data package is exchanged, the counter in both qHSM is incremented, such that the next message can be exchanged with a new communication key. Forward secrecy can be achieved by evolving the secret key with a one-way function at a well-defined time, e.g. after the counter reaches 1000.

Quantum key provisioning in the network can be performed prior to deployment or in the field, e.g. to extend a network. To this end a new qHSM and the source of entangled photons is brought to the location of an existing node and is paired with that qHSM. This is repeated for each pairing that is to be established. This enables extending key distribution networks after deployment. This can be of interest for mobile users, which only need to pair their device with one qHSM to have access to end-to-end encrypted communication with every other user in the network without relying on public key algorithms.

Figure 3:
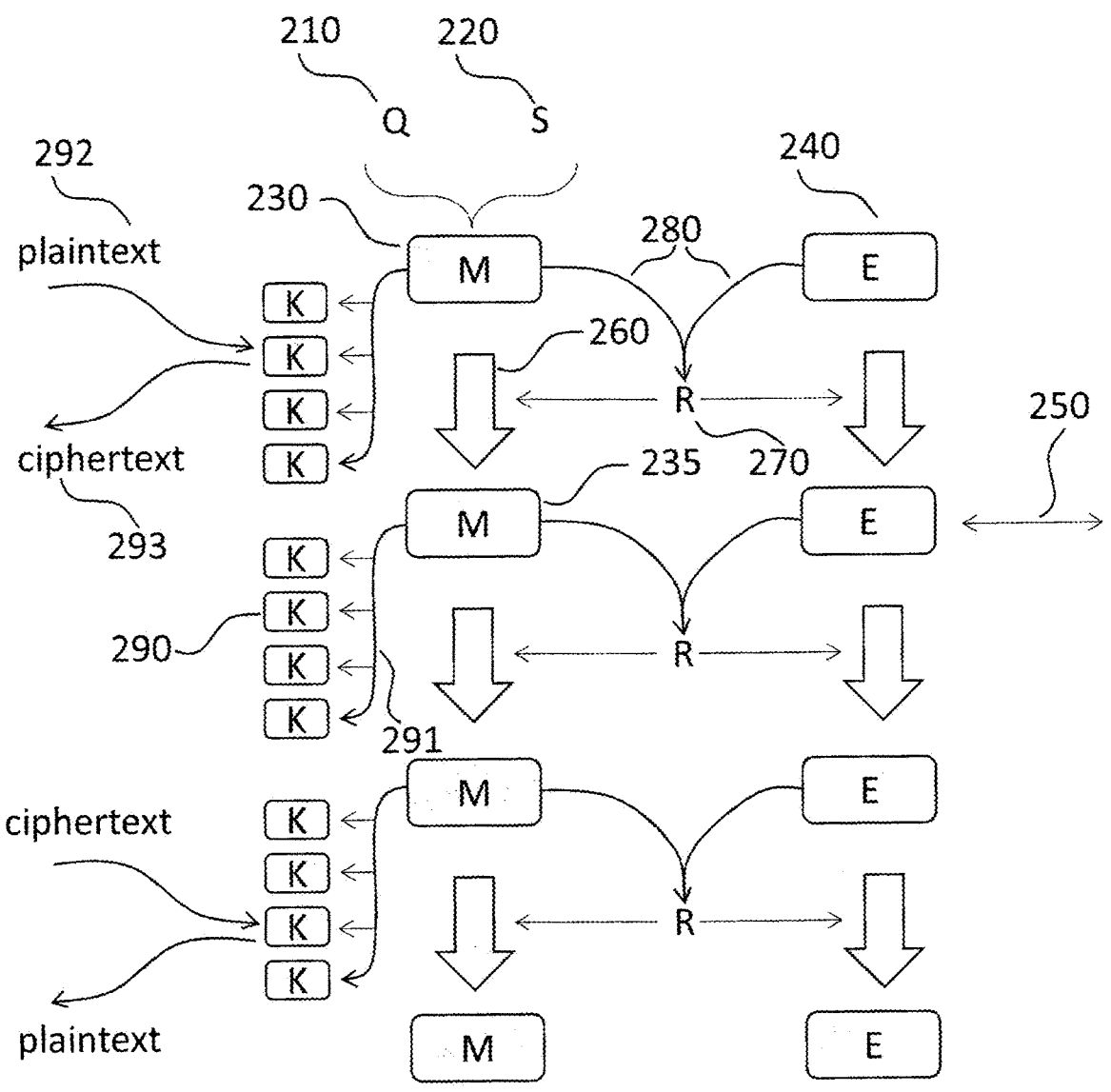
FIG. 3 schematically shows an embodiment of a symmetrical encrypted communication from plain text to cipher text.

FIG. 3 shows a rekeying mechanism that can be constructed from block ciphers, hence not requiring additional assumptions compared to conventional QKD in combination with symmetric encryption based on block ciphers to provide security. For practical purposes, the rekeying mechanism can involve a quantum-provisioned common secret key Q 210, a bit string S 220 common to the paired qHSM, which is provisioned by conventional means and may be public. The combination of Q and S are the initial master key M 230. It further can involve a third shared bitstring E 240, which is initially provisioned by conventional means, and can be used to renew the entropy of the master key 250. At a well-defined point in time, e.g. after a certain number of data packages is exchanged between the paired qHSM, the master key is transformed in a way which is hard to invert 260. This could for example be achieved by deriving a bitstring R 270 from the current master key M and the bit string E using a hash function 280, and employing R to encrypt M (and E), for example with a block cipher. The encrypted version of M 235 will serve as the new master key M. The same can be performed for E.

Figure 4:
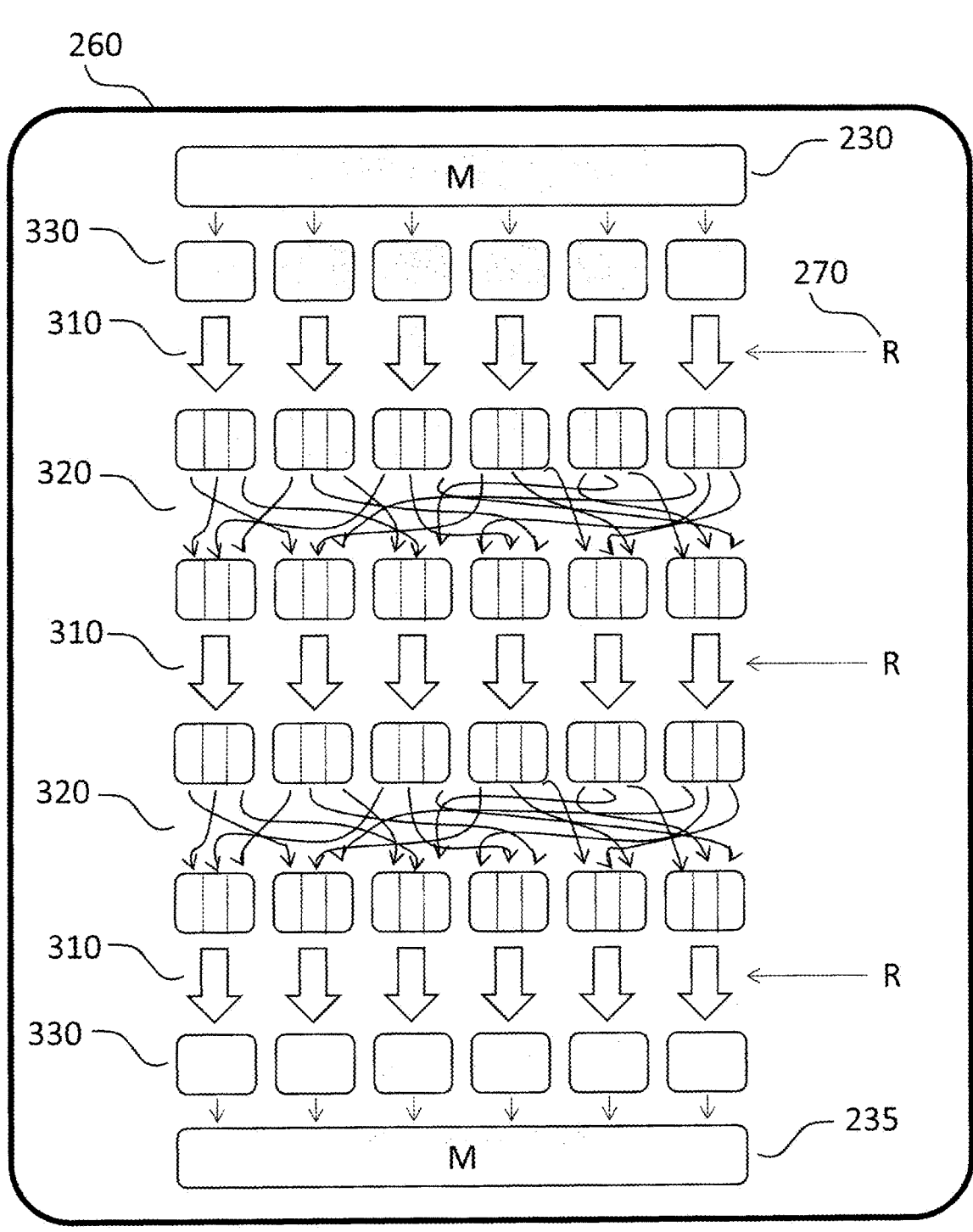
FIG. 4 schematically shows an embodiment of the transformation of a master key M.

FIG. 4 shows the use of a block cipher 310 iterating the encryption step with permutations of fractions of the blocks 320 of the master key M (or the shared bitstring E) in between. This results in a fast diffusion of information between the blocks 330 of the master key M, ensuring that knowledge on M gained between transformations is of minimal use for subsequent master keys 235. Using block ciphers and permutations of M in the transformation (or evolution) step ensures that the quantum-provisioned entropy of the secret key Q, and hence its information theoretic security is preserved. The additional bit stretching string S is mixed with Q in the evolution steps and ensures that collision attacks on the master key M are not efficient, as the most efficient way to guess M is to guess Q and transform it. The transformation of the master key M can prevent conventional side channel attacks and provides forward security, i.e. even if an adversary obtains control of a qHSM and can retrieve M, all keys prior to the latest transformation seem random.

The entropy of E can be renewed using the encrypted channel between the paired qHSM, either by direct exchange of random bit strings, or using key agreement mechanisms such as conventional Diffie Hellman or a quantum resistant alternative 230. This can provide break-in-recovery on the master key level, as an adversary would need to have knowledge of the master key M, but also of shared bitstring E to predict the master key M after the next transformation. Separating the master key M and shared bitstring E ensures that the entropy of the secret key Q is not drained over time, losing the information theoretical security of the master key, or more precisely, of bit length equivalent to the length of the secret key Q.

Communication keys K 290 are derived from the master key M and are used to encrypt the data exchanged between the qHSM. They can be derived using a cryptographic hash function 291 processing master key M and a counter, which is synchronous between the paired qHSM (cp FIG. 3). To inherit the full entropy of the master key M, it is important that the hash function 291 has a sufficiently large internal space. If the master key M is evolved frequently, it can be sufficient and computationally more efficient to use a hash function that has an internal state at least as large as the communication key K. The qHSM does not expose the session keys K either but can be queried with a plaintext 292 and returns the ciphertext 293, or vice versa. Overall, this procedure ensures that the entropy of the initial quantum provisioned key Q is maximally used, and the key material is maximally protected against exposure.

The master key M, as well as entropy renewal pool E, can be stored in an encrypted state, to prevent a security breach by an adversary gaining access to parts of the memory of the qHSM. The qHSM can also have a true random number generator integrated to provide entropy for initialization vectors in the encryption, or for key generation in networked operation (see below).

The present invention has several advantages over the prior state of the art. As the quantum channel is disconnected after key provisioning, the communication distance between the partners is not limited anymore by the channel loss. Furthermore, one quantum communication setup can be used to pair numerous qHSM, such that the marginal costs are only those of the qHSMs themselves, as would be the case for conventional HSM-based public key encryption.

Another advantage is that renewal of communication keys is not limited anymore by the secret key rate, but by the computational resources of the qHSM used for rekeying. Hence, the communications keys can be changed more rapidly compared to conventional QKD, potentially increasing the overall security of the communication (which ideally is limited by the symmetric encryption in both cases, as this features the shortes key length of the system). It furthermore can be used in mobile applications, as no physical quantum channel is required for the operation.

Figure 5:
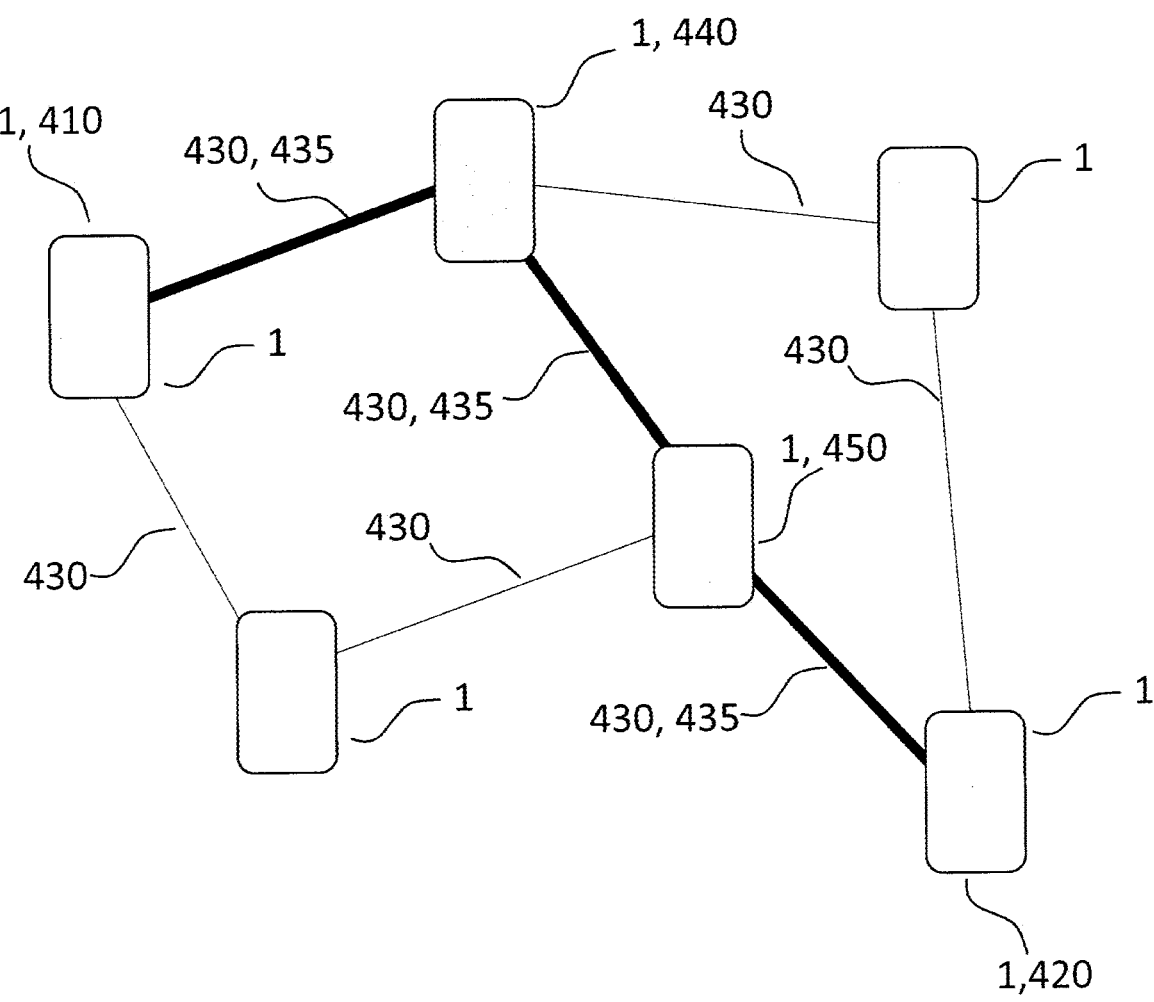
FIG. 5 schematically shows an embodiment of a communication network with multiple qHSM and other hardware secure modules (HSM).

FIG. 5 shows multiple qHSM 1 grouped into a network. Here, each qHSM is paired 430 with one or more other qHSM, using QKD to provision long, information theoretically secure keys. Secret communication keys K for direct encryption between any two HSM in the network can be established by one qHSM (A, 410) generating a random key P and defining a path 435 described by routing data R to the other HSM (B, 420) in the network using encrypted channels 430. The key P and the routing data R are encrypted and sent to the next qHSM 440 in the routing path. That qHSM decrypts P and R, and, without exposing it, re-encrypts it and sends it to the next module 450 in the routing path, until the data reaches the qHSM (B, 420). Secret sharing, for example using multiple independent routing paths, can be employed to safeguard against individual compromised modules or channels, further increasing the security of the key distribution network. The advantage of such a network of modules is, that the owner of the module or the key distribution network does not need to trust the entity provisioning the keys, as the provision mechanism is information theoretically secure, that means the entity performing the initialization does not have any information about individual secrets Q, not even public keys.

The network can be extended to users with qHSM using other key distribution mechanisms, such as (conventional or post-resistant) asymmetric encryption or QKD. The advantage here is that the other key distribution mechanism only needs to be employed over a short distance. This can enable high rate QKD. The use of asymmetric algorithms (conventional or quantum resistant) can be considered an acceptable risk in a local environment (for example within an office building) in contrast to long distance communication (e.g. transatlantic) where adversaries with unknown technical capabilities can have access to the communication channel. Hence the cryptographic system can employ linked qHSM for long distances, and other means for short distance communication.

Quantum communication over long distances is challenging due to loss in quantum channels. In conventional quantum key distribution, where the communicating parties use quantum communication to exchange a secret key in order to encrypt a classical communication channel, this limits the communication distance L between the two parties. Quantum repeaters can circumvent this limit by relaying entanglement to distant communication parties. Progress in the experimental implementation of a practical repeater technology recently allowed for exceeding the quantum channel capacity of an equivalent direct link. However, the realization of a fully functional quantum repeater ready for broad adoption remains elusive. Therefore, practical implementations of long-distance quantum key distribution have focused on methods to extend the length of intermediate (500-1000 km) point-to-point links and trusted node networks for multiple users and long distances. These networks rely on quantum communication between classical relays, which need to be trusted with all key material. While it might seem challenging to realize a system that does not leak any unintended information, a similar concept, hardware security modules (HSM), has proven in practice to work exceptionally well in conventional cryptography. These tamper-evident or -resistant cryptographic co-processors, in their simplest form, store and manage keys, and encrypt or decrypt messages provided by users.

The key material is not even exposed to the user, safeguarding it against unintended exposure. Unlike HSM, and despite demonstrations of the necessary technology, trusted node QKD networks have not yet been widely adopted. This is related to a variety of challenges facing a large-scale implementation of QKD. Operating live quantum channels requires additional physical infrastructure in contrast to public key cryptography with conventional or quantum resistant algorithms. The nodes of the network need to be relatively closely spaced and require specialized equipment and geographically continuous networks, leading to high costs of adoption. Despite technological advances, secret key rates remain far below the bandwidth of classical channels, such that symmetric key encryption is still required in most applications, hence sacrificing the information theoretical security of QKD itself. Furthermore, QKD systems have side-channels related to their open interface to the live quantum channel. These potential vulnerabilities need to be checked and prevented, much like in conventional cryptographic systems. This can be solved by device independent (DI) QKD, which allows for statistical verification that no side-channels were exploited in a direct QKD link between two trusted nodes, but is yet to be demonstrated.

The disclosed invention proposes an implementation of a long-distance, QKD-based cryptography network, which addresses the above challenges. It is based on the same assumptions as a trusted node QKD network, as well as the sufficient security of symmetric key block ciphers. The network comprises trusted nodes (or HSMs) which are initialized with a strong common secret using QKD over a short quantum channel. Thereafter, they are used to their respective operational location, separating the length of quantum channel and distance of the communicating parties. Using cryptographic re-keying methods, the lifetime of the common secret is extended to its combinatorial limit, which grows exponentially with the size of the quantum-generated common secret and can exceed the physical lifetime of any active communication device. We first describe the initialization and operation of a single link. Then, we demonstrate that the weakest point of the system remains the symmetric key cipher used to encrypt the classical data link, as in most other (ideal) QKD networks. Finally, we describe an implementation of a key distribution network, and discuss the compatibility with conventional QKD links and post-quantum cryptography. The trusted node or quantum-enabled hardware security module (qHSM) is a device capable of quantum key distribution with a partner device. It has (i) an interface to a quantum channel, (ii) can send and receive information to another module through a public (or private) authenticated channel, and (iii) can encrypt and decrypt messages in a query-response method, i.e. without exposing its cryptographic key. (iv) It further does not leak any unnecessary information other than required for the quantum key distribution protocol. An additional requirement for a practical implementation is that the qHSM can be disconnected from the quantum channel and moved.

Two qHSMs (A and B, belonging to Alice and Bob) are initialized by connecting them to a common quantum channel and an authenticated public classical channel. Alice and Bob now perform quantum key distribution, including error correction and privacy amplification to establish a common secret Q of NQ bits length. They test for side-channel attacks as necessary or ideally perform device-independent QKD. Thus, the common secret Q is certain to be only known by Alice and Bob. In addition, they negotiate a second random bit-string S of length NS over the classical channel, as well as an operational starting time $t_0$, and an operational protocol E=(G, Es), consisting of a key generation algorithm G, and the protocol Es for symmetric cryptography before disconnecting the devices and moving them to their final locations.

At $t=t_0$, the master key is defined by $M(t_0)=Q \frown S$ of length NM=NQ+NS ($\frown$ denotes the concatenation of two bit-strings), and the devices are considered to be in their operational state. A variety of methods G are suitable for re-keying of M, i.e. deriving temporary communication keys $K=G(M, ...)$, such that the life time of Q is extended to its combinatorial limit, i.e. the most promising attack (excluding side channels) is brute-force guessing of the master key.

Intuitively, G acts as a deterministic pseudo-random number generator (PRNG), which is seeded by M. By keeping their algorithms synchronous, e.g. with a counter j, qHSM A and B can use the output of as G keys for a symmetric encryption of their data channel. Without knowledge of the seed, a good PRNG can produce numbers that seem random, even if some fraction of the output is known. In other words, an adversary that learn communication key $K_{j0}=G(M, j0)$ only has a negligible advantage in guessing other keys $K_{j \neq j0}$, a property called forward security for past (j<j0) and break-in-recovery for future (j>j0) keys. Breaking a substantial part of the encryption thus would require the full reconstruction of the common secret Q. We further want to ensure that G provides forward security in case M is recovered by an adversary, e.g. by physically deconstructing it, keeping past communications between A and B secret. This can be achieved by periodically evolving M with a one-way function, which is hard to invert. Both, PRNG and one-way-functions can be constructed from a sufficiently secure block cipher, such that no additional assumptions are necessary to construct G. We note that neither can be proven without some assumption of complexity, which in this case is provided by the block cipher.

Here, we briefly describe a simple algorithm Gs to illustrate the underlying concept and security features. For details and a more complex algorithm, which further optimizes the required computational resources. At times $ti=t_0+ i \cdot \delta t$ with integer i>0 the master key is evolved with an injective one-way function $M(ti)=f(M(ti-1))$. This can be achieved by a deterministic permutation and encryption with an autokey cipher of the prior master key. By discarding $M(ti-1)$, the key is lost, rendering the inversion of f as hard as breaking the block cipher, and securing all prior keys. The communication keys $K_{i,j}$ with NK bits are derived using a cryptographic hash function $K_{i,j}=HNK (M(ti) \frown j)$. This one-way function maps an input of arbitrary length onto an output of NK bits, with small changes of the input, such as an increase in counter j, produce seemingly uncorrelated outputs.

Figure 6:
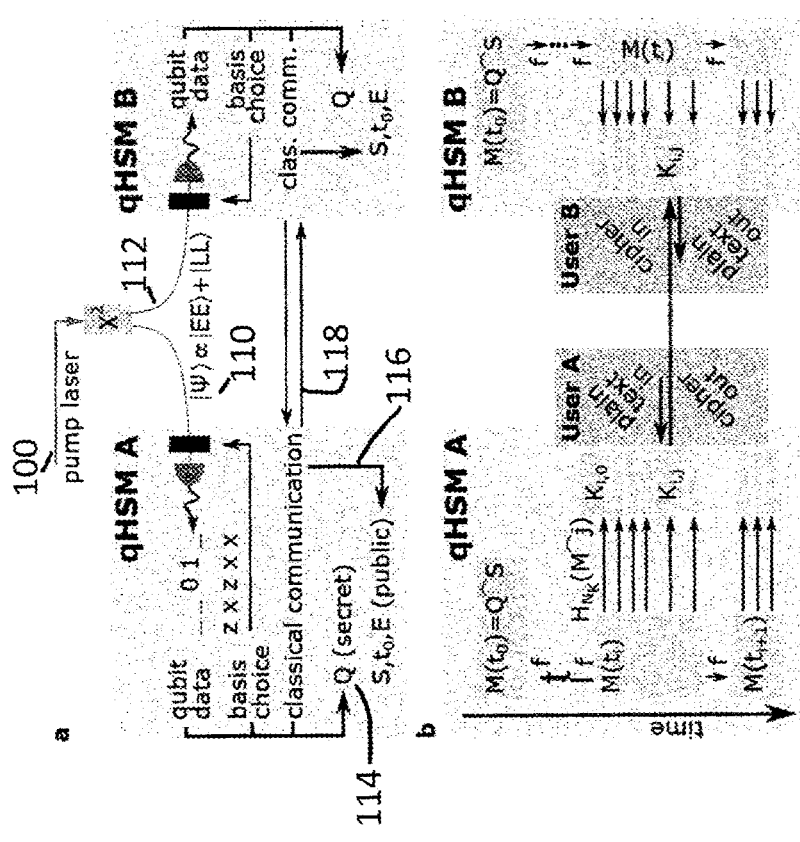
FIG. 6 schematically shows an embodiment of an operation of two qHSM during initialization (a) and during operation (b).

FIG. 6 gives a summary of the quantum-enabled hardware security modules qHSM A and qHSM B in an initialization phase a. A pump laser 100 provides an entangled quantum state 110 which is provided to qHSM A and B through a common quantum channel 112. Using a random basis choice, qubits are measured, and using the classical communication channel 118, the relevant data is exchanged (for example the basis choice, a subset of the generated key to determine the quality of the quantum state, and information pertaining to error correction and privacy amplification) to generate a secret key Q for both modules A and B. After the secret key Q 114 is generated, the common quantum channel 112 between both qHSM modules is disconnected. Additionally, a classical communication channel 118 between both modules A and B can be used to exchange further data.

In step b which follows the initialization phase a, both modules generate an initial master key K by stretching the secret key Q using a stretching key S. Based on the initial master key $M(t_0)$, successively further master keys $M(t_i)$, $M(t_{i+1})$ are generated. The master keys M are used to generate session keys $K_{i,j}$.

For the purpose of communication, user A enters a plain text into qHSM A where it is encrypted using the actual session key $K_{i,j}$. The cipher text goes out to qHSM A and enters qHSM B as cipher in. Here qHSM B deciphers the ciphered text using the session key $K_{i,j}$ and provides a plain text out to user B.

During the step of transforming the master key M it is common to use so-called one-way functions. In mathematics it is considered an open problem to prove that one-way functions exist. In cryptography, a lot of functions are used that empirically have shown to exhibit the properties of one-way functions. One-way functions can be considered as easy to compute and hard to invert.

It is worth noting that the term "classical communication" is used to simply denote every non-quantum communication.

In summary, a new key distribution network is presented based on forward-secure pseudo random number generators which are initialized by QKD, called quantum-enabled hardware security modules. In such networks, individual encrypted links do not require a direct physical connection. Hence, links can cover arbitrary distance and can be deployed on mobile devices. We showed that such a network provides only marginally weaker security than an ideal, conventional QKD network relying on block ciphers for data encryption. Practically, there can be various security concerns, which are mostly shared with other implementations such as trusted node networks and DIQKD over quantum repeater networks: E.g. is the manufacturer trustworthy, and are there any backdoors in the code operating the qHSM. This can be largely circumvented by using open-source hard- and software, and/or by validation and certification by a trusted authority, as is the case for conventional cryptographic modules in the 140 series of the Federal Information Processing Standard. Proper initialization could be ensured by self-testing of the devices for side-channels, letting one of the communication partners or independent organizations perform it. By using independent classical channels for the encrypted communication, man-in-the-middle attacks can be prevented, as the initialization with Q effectively also serves as the authentication token in conventional QKD networks. It is worth noting that S does not need to be public, but can be kept secret, although not information theoretically secure. The rest of the protocol equally works with N_Q=0 and a secret S. This classical key exchange can be of interest if a trade-off between unconditional security and ease of initialization is required.

The invention claimed is:

1. A method of encryption for quantum-secured communication, comprising:

providing a pair of quantum-enabled hardware security modules that comprise, an interface to a temporarily common quantum channel, and an interface to a communication channel;

obtaining a secret key via the temporarily common quantum channel using quantum key distribution;

sharing the obtained secret key with the pair of quantum-enabled hardware security modules for a symmetrical encryption between the pair of quantum-enabled hardware security modules;

disconnecting the temporarily common quantum channel from at least one of the pair of quantum-enabled hardware security modules; and providing a communication network that comprises at least two nodes configured to communicate using symmetrical encryption between the pair of quantum-enabled hardware security modules sharing a same secret key, wherein each of the pair of quantum-enabled hardware security modules transforms a previous master key into a new master key after at least one of: (i) a predetermined period of time; and (ii) a predetermined number of data packages are exchanged between the pair of quantum-enabled hardware security modules, and wherein the transforming of the previous master key to the new master key is determined by a temporary key negotiated between or computed by the pair of quantum-enabled hardware security modules.

2. The method of claim 1, further comprising:

generating a master key from a shared secret key of each of the pair of quantum-enabled hardware security modules, and deriving session keys for encrypted communication between the pair of quantum-enabled hardware security modules using the master key.

3. The method of claim 1, further comprising obtaining the secret key from entangled photons, and providing each of the pair of quantum-enabled hardware security modules with a cryptographic coprocessor for generating session keys and a plurality of photon detectors integrated on a same hardware as the cryptographic coprocessor.

4. The method of claim 1, further comprising each of the pair of quantum-enabled hardware security modules generating an initial master key from a symmetric stretching key and the secret key, wherein the initial master key is longer than the secret key.

5. The method according to claim 1, wherein transforming the previous master key to the new master key includes at least one of the following steps: (i) deriving a temporary key from a current master key; (ii) transforming with a one-way-permutation and a block cipher using the temporary key; and (iii) deleting the temporary key.

6. A device for quantum-secured communication, comprising:

a pair of quantum-enabled hardware security modules that each comprise:

a cryptographic coprocessor;

a classical communication channel; and at least one interface configured for a common quantum channel, wherein the cryptographic coprocessor of each of the pair of quantum-enabled hardware security modules generates a secret key from received photons exchanged via an interface to the common quantum channel, wherein the secret key is generated in an initializing step, wherein the cryptographic coprocessor of each of the pair of quantum-enabled hardware security modules generates a master key based on the secret key, wherein the cryptographic coprocessor of each of the pair of quantum-enabled hardware security modules is configured for a symmetrically encrypted communication via the classical communication channel between the pair of quantum-enabled hardware security modules in a communication network, wherein the cryptographic coprocessor of each of the pair of quantum-enabled hardware security modules transforms a previous master key $(M_i)$ into a new master key $(M_{i+1})$ based on a temporary key negotiated between or computed by the pair of quantum-enabled hardware security modules (qHSM) over the symmetrically encrypted channel, and wherein the cryptographic-coprocessor of each of the pair of quantum-enabled hardware security modules generates session keys based on the master key.

7. The device for quantum-secured communication according to claim 6, wherein each of the pair of quantum-enabled hardware security modules further comprises an optical input and a plurality of avalanche photodetectors that are each connected to the optical input of each of the pair of quantum-enabled hardware security modules.

8. The device for quantum-secured communication according to claim 6, wherein the cryptographic coprocessor of each of the pair of quantum-enabled hardware security modules is configured to generate an initial master key from a symmetric stretching key and the secret key, wherein the initial master key is longer than the secret key.

9. The device for quantum-secured communication according to claim 6, wherein the cryptographic coprocessor of each of the pair of quantum-enabled hardware security modules is configured to transform a previous master key into a new master key after at least one of: (i) a predetermined period of time; and (ii) after a predetermined number of data packages are exchanged between the pair of quantum-enables hardware security modules.

10. The device for quantum-secured communication according to claim 9, wherein the cryptographic coprocessor of each of the pair of quantum-enabled hardware security modules is configured to transform the previous master key into a new master key by at least one of: (i) deriving a temporary key from a current master key; (ii) transforming with a one-way-permutation and a block cipher using the temporary key; and (iii) deleting the temporary key.

* * * * *